US006496579B1

(12) United States Patent
Mashinsky

(10) Patent No.: US 6,496,579 B1
(45) Date of Patent: *Dec. 17, 2002

(54) METHOD OF AND SYSTEM FOR EFFICIENT USE OF TELECOMMUNICATION NETWORKS

(75) Inventor: Alexander Mashinsky, New York, NY (US)

(73) Assignee: Anip, Inc., Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/372,024

(22) Filed: Aug. 9, 1999

Related U.S. Application Data

(63) Continuation of application No. 09/009,007, filed on Jan. 16, 1998, now Pat. No. 6,078,654, which is a continuation of application No. 08/728,670, filed on Oct. 10, 1996, now Pat. No. 5,710,809, which is a continuation of application No. 08/320,269, filed on Oct. 11, 1994, now abandoned.

(51) Int. Cl.[7] .............................................. H04M 3/42
(52) U.S. Cl. .................... 379/220.01; 379/229
(58) Field of Search ............................ 379/207.03, 219, 379/220.01, 221.01, 221.02, 229, 115.01, 115.02

(56) References Cited

U.S. PATENT DOCUMENTS

| | | |
|---|---|---|
| 4,068,101 A | 1/1978 | Chemarin |
| 4,166,929 A | 9/1979 | Shenbein |
| 4,313,035 A | 1/1982 | Jordan et al. |
| 4,313,036 A | 1/1982 | Jabara et al. |
| 4,594,477 A | 6/1986 | Noirot |

(List continued on next page.)

FOREIGN PATENT DOCUMENTS

| | | |
|---|---|---|
| EP | 0501903 | 9/1992 |
| EP | 0658061 | 6/1995 |
| GB | 2198011 | 6/1988 |
| GB | 2316266 | 2/1998 |
| WO | WO 92-01350 | 1/1992 |

(List continued on next page.)

OTHER PUBLICATIONS

"Survey: Telecoms", in *The Economist*, vol. 344, No. 8034 (Sep. 13, 1997), pp56/1–56/34.
"Auctioning Telephone Calls", in *The Economist*, vol. 344, No. 8032 (Aug. 30, 1997), pp47–48.

(List continued on next page.)

*Primary Examiner*—Scott L. Weaver
(74) *Attorney, Agent, or Firm*—Chi K. Eng

(57) ABSTRACT

A system for use of a telecommunications voice network includes a communication node local to a calling location for acquiring calling and called party identification numbers and transmitting them to a central switching unit associated with a called location, through a transception channel independent of the telecommunications voice network. Further provided is a central switching unit for interrogating the called location to obtain a call supervision status thereof. Also provided is an apparatus for completing a first phonecall from the switching unit to the called location if the call supervision status is that of an answer, and for originating a second phonecall through the telecommunications network to the calling location. Teleconferencing of the first and second phonecalls then occurs. Further provided is an apparatus for providing an uncompleted call status signal to the central switching unit if the call status is that of a no answer or busy. The calling party is then appropriately advised. Upon termination of the second phonecall an answer supervision signal is sent by the local node to the central switching unit.

10 Claims, 3 Drawing Sheets

U.S. PATENT DOCUMENTS

| | | |
|---|---|---|
| 5,012,515 A | 4/1991 | McVitie |
| 5,027,387 A | 6/1991 | Moll |
| 5,065,393 A | 11/1991 | Sibbit et al. |
| 5,163,042 A | 11/1992 | Ochiai |
| 5,247,676 A | 9/1993 | Ozur et al. |
| 5,311,583 A | 5/1994 | Friedes et al. |
| 5,313,467 A | 5/1994 | Varghese et al. |
| 5,353,331 A | 10/1994 | Emery et al. |
| 5,408,518 A | 4/1995 | Yunoki |
| 5,408,526 A | 4/1995 | McFarland et al. |
| 5,414,752 A | 5/1995 | Jonsson |
| 5,425,084 A | 6/1995 | Brinskele |
| 5,425,091 A | 6/1995 | Josephs |
| 5,438,616 A | 8/1995 | Poeples |
| 5,479,495 A | 12/1995 | Blumhardt |
| 5,506,887 A | 4/1996 | Emery et al. |
| 5,515,425 A | 5/1996 | Penzias et al. |
| 5,526,413 A | 6/1996 | Cheston et al. |
| 5,533,100 A | 7/1996 | Bass et al. |
| 5,606,602 A | 2/1997 | Johnson et al. |
| 5,608,782 A | 3/1997 | Carlsen et al. |
| 5,608,786 A | 3/1997 | Gordon |
| 5,638,363 A | 6/1997 | Gittins et al. |
| 5,661,790 A | 8/1997 | Hsu |
| 5,675,636 A | 10/1997 | Gray |
| 5,706,507 A | 1/1998 | Schloss |
| 5,764,741 A | 6/1998 | Barak |
| 5,771,279 A | 6/1998 | Cheston et al. |
| 5,790,642 A | 8/1998 | Taylor et al. |
| 5,825,858 A | 10/1998 | Shaffer et al. |
| 5,917,897 A | 6/1999 | Johnson et al. |
| 5,940,479 A | 8/1999 | Guy et al. |
| 5,970,126 A | 10/1999 | Bowater et al. |
| 5,999,598 A | 12/1999 | Henrick et al. |
| 6,047,006 A | 4/2000 | Brakefield et al. |

FOREIGN PATENT DOCUMENTS

| | | |
|---|---|---|
| WO | WO 93-16543 | 8/1993 |
| WO | WO 93-16544 | 8/1993 |
| WO | WO 93-16546 | 8/1993 |
| WO | WO 94-28683 | 12/1994 |
| WO | WO 97/16916 | 5/1997 |

OTHER PUBLICATIONS

"Book Review, Impact Of Liberalization On Resale And Callback Telecommunications Policy", vol. 21, No. 3, pp275–276 (1997).

Brennan, "Industry Parallel Interconnection Agreements", Information Economics and Policy, vol. 9, No. 2, pp133–149.

Tao et al., "Internet Access via Baseband and Broadband ISDN Gateways", Dec. 4, 1994 (IEEE).

R. Frieden, "The International Telecommunications Toll Revenue Division Process", *International Telecommunications Handbook* (1996), pp133–149.

Y. Levy, S. Durinovic–Johri, and R.A. Milito, "Dynamic Network Call Distribution with Periodic Updates", in *Teletrafic Science and Engineering*, vol. 1a (J. Lbetoulle, and J.W. Roberts, ed.) (1994), Elsevier.

Raif O. Onvural, *Asynchronous Transfer Mode Networks: Performance Issues* (1994), Section 6.3–6.4, Artech House.

B. Yuhas & N. Ansari ed., *Neural Networks in Telecommunications* (1994), Chapter 1, Kluwer.

Globerman et al., "Competition in Public Long–distance Telephone Markets in Canada", Telecommunications Policy, vol. 17, No. 4, pp297–312 (1993).

R. Frieden, "International Toll Revenue Division: Tackling the Inequities and Inefficiencies", in *Telecommunications Policy*, vol. 17, No. 3 (Apr., 1993), pp221–133.

R.J. Horrocks & R.W.A. Scarr, "Chapter 24: Tariff Principles", in *Future Trends in Telecommunications* (1993), pp 387–392, J. Whitaker & Sons.

K. Cheong & M. Mullins, "International Telephone Service Imbalances: Accounting Rates and Regulatory Policy", Telecommunications Policy, vol. 15, No. 2 (Apr., 1991), pp107–118.

R.M. Frieden, "Accounting rates: The Business of International Telecommunications and the Incentive to Cheat", 43 Federal Communications L.J. 111 (1991).

K.B. Stanley, "Balance of Payments, Deficits, and Subsidies in International Communications Services: A New Challenge to Regulation", in 43 Administrative Law Review 411 (Summer 1991).

N.F. Maxemchuk & M. El Zarki, "Routing and Flow control in High Speed Wide–Area Networks", in *Proceedings of the IEEE*, vol. 78, No. 1 (Jan. 1990), pp204–221, IEEE.

A. Girard, *Routing and Dimensioning in Circuit–Switched Networks* (1990), Addison–Wesly, (Table of Contents only).

B. Warfield & P. Sember, "Prospects for the Use of Artifical Intelligence in Real–Time Network Traffic Management", in *Computer Networks and ISDN Systems*, vol. 20 (1990), pp163–169, Elsevier Science.

J. Potvin, & S.F. Smith, "Flexible Systems for the Design of Heuristic Algorithms in Comples or Domains", in *Impract of Recent Computer Advances on Operations Research* (1989), PP 332–344, Elsevier Science.

G.L. Shultz & R.R. Meyer, "Flexible Parallel Algorithm for Block–Constained Optimization Problems", in *Impact of Recent Computer Advances on Operatins Research* (1989), PP 82–91.

METHOD OF AND SYSTEM FOR EFFICIENT USE OF TELECOMMUNICATION NETWORKS

APPLICATION FOR LETTERS PATENT

This is a continuation of U.S. Ser. No. 09/009,007, filed Jan. 16, 1998, now U.S. Pat. No. 6,078,654, which is a continuation of U.S. Ser. No. 08/728,670, filed Oct. 10, 1996, now U.S. Pat. No. 5,710,809, which is a continuation of U.S. Ser. No. 08/320,269, filed Oct. 11, 1994, now abandoned, each of which is hereby incorporated by reference.

Be it known that I, Alexander Mashinsky, a resident of the State of New York and citizen of the Republic of Israel, have invented a certain new and useful improvement in a Method of and System for Efficient Use of Telecommunication Voice Networks, of which the following is a Specification:

BACKGROUND OF THE INVENTION

A long standing problem in the area of international telecommunications and, more particularly, in the area of initiating and completing international phonecalls over public switched service voice networks has been that a considerable portion of the so-called system time, that is, the period between initiation of a phonecall and either completion thereof or determination that the call cannot be completed (because of a no answer or busy signal) is non-billable in nature. For example, billing-protocols, as they have evolved over time, both in the United States and abroad, only permit billing to the ultimate customer for the period between call completion and call termination as perceived by the ultimate customer. In other words, under such established billing protocols, the ultimate customer (as opposed to an intermediary such as a hotel or aggregator) cannot be charged for the system time required to ring the called location to determine if the call can be completed. Further, such phonecalls do not permit billing for the so-called disconnect time, that being the time between the termination of the phonecall as perceived by the caller and the actual stand down or reset time by the public switched service network.

The prior art use of system time in such a non-productive fashion has also operated to limit total usable system capacity in areas where trunk, channel or bandwidth capacity is finite, as in third world situations and in satellite transception.

To minimize such non-billable system time and, as well, to effect other advantages, the development of so-called call back technology, also known as reverse direction phonecalling, has developed. In callback technology, a so-called network control module induces a callback from a central switching station associated with the called location. This call-back procedure has the advantage not only of reducing unbillable system time inasmuch as a callback will not be initiated if the called location is unreachable but, as well, to effect considerable saving in call cost by virtue of the fact that call cost from Location A to Location B typically does not equal call cost from Location B to Location A, this being particularly the case in international phone communications.

The technology of point-to-point reverse direction phonecalling, both for purposes of minimizing system time and for purposes of minimizing call cost based upon the directionality of the call, is well developed in the art, as is exemplified by U.S. Pat. No. 5,027,387 (1991) to Moll, entitled Reverse Direction Calling System.

Such reverse direction calling technology has, however, not been universally available. For example, in a hotel environment, a guest at the hotel has no means of answering a callback directly since the callback must be received by an operator that must know in advance who the call is for and where to transfer it to. This difficulty, plus other factors relative to billing procedures in hotels, has prevented most major hotels from employing international callback services. Similar problems are encountered by other large facilities such as hospitals, industrial installations, governmental sites and telephone companies themselves.

A further limitation in the art of callback technology has existed in the area of teleconferencing of international calls in which, for reasons of reduction of system time use and avoidance of phone charges by high priced national phone companies, it is desirable to route a call, from a first foreign country to a second foreign country, through a third foreign country (known as transit country) typically the United States, Canada or United Kingdom, to avoid the typically high country-to-country charge between the first and second countries. For example, in situations where call supervision exists, it is generally cost-effective to reconfigure what would otherwise be a call from Country A to Country B into the form of teleconferencing of two separate calls, namely, a call from Country C (typically the U.S.) to Country A, with a call from Country C to Country B. This procedure will, because of the high cost of calls originated from Country A, be less than the cost of a direct dialed Country A to Country B phonecall. In other words, where all legs of the CA and CB phonecalls are completed, the total cost of the teleconferenced CA and CB calls is less than the cost of the direct dialed Country A to Country B cost would have been.

The problem, however, with such callback and teleconferencing procedures has been that in situations where either or both the CA and CB legs of the teleconference cannot be completed because, for example, of a busy or no answer at Locations A or B, the provider of the international callback service must absorb the cost of the system time associated with interrogating locations in Countries A and B in attempting to complete the CA and CB legs of the phonecall. As such, the international reverse callback procedure can involve considerable losses to the callback operator which can only be recovered by increasing the price charged for completed calls.

Another problem in international callback that can increase cost to the operator is that of reverse answer supervision after a call termination, or the lack thereof. That is, without a call completion signal transmitted back from the calling location to the transit country switch after call termination, it can-be difficult for the transit switch (in Country C) to know when a call is finished. This issue can have devastating consequences to the callback operator.

The instant invention provides a solution to the above problems and, additionally, provides a means by which hotels, and other similarly situated establishments, can make use of international callback technology and, further, can do so on a more profitable basis than has been available to any prior user of such technology. The present invention also addresses problems of billing to intermediaries and end users of callback facilities.

SUMMARY OF THE INVENTION

The present novel method of use of a public telecommunications voice network (typically a public switched service network) includes the steps of assigning a caller identification number to a calling location and of assigning a called party identification number for the location to be called. Thereafter, use is made of a transparent communications node, associated with the calling location, which transmits said caller and called party identification and security numbers to a central switching unit in the nature of a digital tandem ISDN switch or private line data service which is associated with the called location. Said transmission of caller and called party identification number to the central switching unit proceeds through a data signalling channel independent of the public telecommunications voice network. Said central switching unit is then employed to interrogate the called location to obtain the call supervision status thereof. If said call status is that of an answer, said central switching unit will complete a first phonecall from said unit to the called location and will originate a second phonecall through the telecommunications network to the calling location. Upon completion of both phonecalls, they are teleconferenced, thereby placing the calling and called parties in communication with each other. However, if said call status at the called location is that of a no answer or busy, an uncompleted call status signal is provided to the central switching unit. Thereafter, the central switching unit may either transmit a call status signal through said independent signalling channel to the local communications node to inform the calling location that the call cannot be completed or, alternatively, the central switching unit may not send any status signal whatsoever to the local communications node. Therein, a predetermined interval of silence from the central switching unit will be interpreted by the local communications node to mean that the call could not be completed. An appropriate advisory will be sent to the calling party. Upon termination of the second phonecall, an answer supervision signal is sent by the local node to the central switching unit.

It is, accordingly, an object of the present invention to provide an improved method and system of telecommunications network use which will operate to reduce system time and operator cost associated with teleconferencing of international calls involving at least one reverse direction phonecall.

It is another object to provide a system of the above type that will increase the efficiency of use of telecommunication resources.

It is a further object to provide a method which will reduce the cost of collect and person-to-person long distance phonecalls.

It is a yet further object to provide a system of the above type usable in connection with multi-trunk switching.

It is a still further object to provide an improved method of telecommunication network use which will enlarge the potential application of reverse direction telephone calling to areas, such as hotel and telephone company use, in which it has not heretofore been usable.

It is another object to provide a system of the above type having reverse answer detection after call termination.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
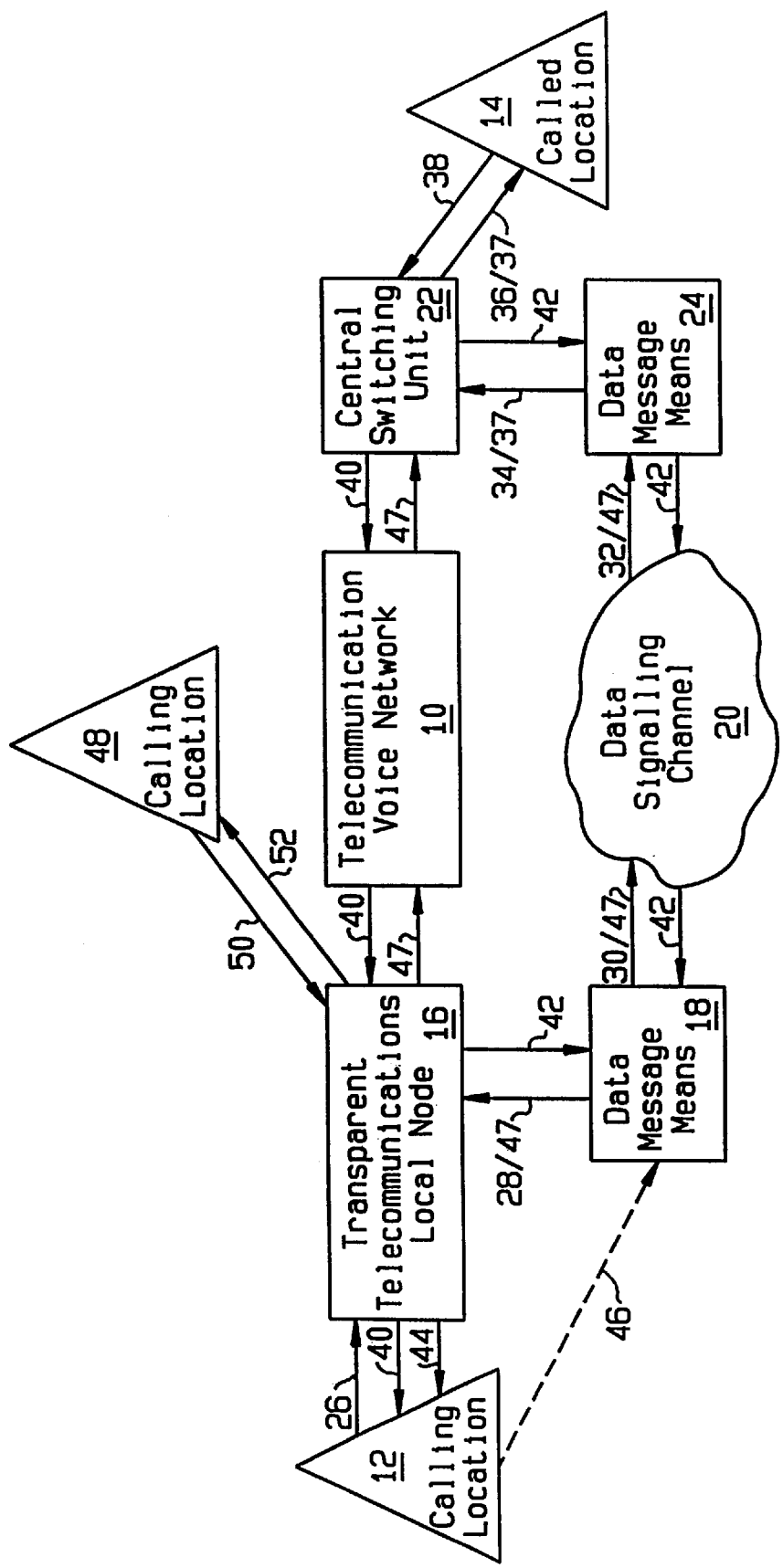
FIG. 1 is a conceptual block diagram indicating the principles of operation of the inventive method.

With reference to the system block diagram view of FIG. 1 there is, in conceptual form, shown a telecommunications network 10 which may, without limitation, include a public switched service network such as that of the well known public carriers, e.g., AT&T, MCI, and SPRINT or, alternatively, may, comprise any of a number of private voice/fax telecommunications network.

Illustrated as the triangular symbol to the left of FIG. 1 is a calling location 12 and, in the triangular symbol to the right of FIG. 1 is represented a called location 14.

The square block to the upper left of FIG. 1 is representative of a transparent telecommunications node 16 which is local, e.g., private lined, to the calling location 12. Such a unit is commercially available from Voice Smart, Inc., Fort Lee, N.J., under the trademark HOTEL LOCAL NODE. Its various capabilities include means to induce a callback from a telephone central switching location. Node 16 is interfacable with a PABX at the user location.

The block to the lower left of FIG. 1 is representative of a first data message means 18 for receiving information from or providing information to local node 16. Data message means 18 also, as is more fully set forth below, provides information to data signalling channel 20 and is able to receive information therefrom. Data message means 18 is preferably provided with means to verify the identity and/or authority of calling location 12. Node 16 and means 18 may comprise the.same physical unit.

It is noted that transception channel 20 represents a communication mode which is external to telecommunications voice network 10. That is, transception channel 20 may take any one of a variety of forms including, without limitation, ISDN switch packet message means, telex, TWX, leased data lines, shared leased data lines, statistical multiplexing of data lines, data or MF over voice (DOV), Satellite (VSAT), PCN, Radio, DTMF and the so-called public packet network.

The block to the upper right of FIG. 1 is representative of a central switching unit 22 which is associated with the called location 14. However, the central switching unit 22 may be physically located at a distance on the order of thousand of miles from location 14. Central switching unit 22 will typically be a device in the nature of a digital tandem ISDN switch, also known as a VX switch. Digital tandem ISDN switches are known in the art and are available from such sources as Voice Smart, Inc., Fort Lee, N.J. under the names of VX SYSTEM 4 and VX SYSTEM 24. In simplest terms, central switching unit 22 is a PABX capable of initiating a reverse direction phonecall when so instructed by a so-called automated attendant activated by the node 16 associated with the calling location 12, as is Taught in U.S. Pat. No. 4,313,036 Jabara and in Moll supra.

The square at the lower right of FIG. 1 represents a second data message means 24, similar to said first data message means 18, the function of which is to facilitate transfer of information between said central switching unit 22 and said signalling channel 20. Second data means and unit 22 may comprise the same physical unit.

With respect to the method of use and operation of the telecommunications components shown in FIG. 1, the instant method entails the assignment by node 16 of a caller identification number to calling location 12. Similarly, there is assigned a called party identification number (typically the called telephone number) for the called location 14.

Thereby, a phonecall 26 originating from caller location 12 is acquired at local node 16 which stores data corresponding to the caller identification number and the called party identification number. Local node 16 then refers to a database which advises it whether to attempt to route the call through channel 20 or whether to employ the conventional communications network 10. If a decision is made to employ the external channel 20, the calling and called party identification numbers, as well as suitable access and security codes, are transmitted, via link 28 to data message means 18.

Data message means 18 comprises digital data processing means in the nature of a 486 type 66 megahertz computer having at least 16 megabytes of memory, a one gig drive, at least one external mode, and an X.25 gateway card. its software includes X.25 connectivity software, and digicard hardware. It will typically operate in a UNIX environment. As such, data message means 18 will accept an input over any public switched service network and will provide an output to any ISDN packet-switched network such as those embodiments of signalling channel 20 set forth above.

The caller location information is then provided over link 30 to said external channel 20 which in turn furnishes such information over link 32 to second data message means 24 associated with the called location 14. The requisite calling and called party identification information is then provided over link 34 to said central switching unit 22 which, using line 36, interrogates called location 14 with a first phonecall 37, which will send back to central switching unit 22 a call supervision status signal 38 which will inform central switching unit 22 as to condition of the called location 14, i.e., a busy condition, a no answer, or a call completion. If said call supervision status is that of an answer, a callback 40 to the calling party is initiated by central switching unit 22, using communications network 10. Thereafter callback 40 proceeds as would a normal phonecall, passing through local node 16 and, therefrom, to the calling location 12. Thereupon, said second phonecall 38 and first phonecall 37 are teleconferenced by central switching unit 22, thusly enabling the calling and called parties to communicate.

In the event that central switching unit 22 receives from the called location 14 a busy or no answer condition, there may be provided an uncompleted call signal 42 to data message means 24 which is transferred therefrom through signalling channel 20, to first data message means 18 and therefrom to local node 16. Thereupon a "called party unavailable," busy signal or other message 44 will be communicated by local node 16 to calling location 12.

It is to be appreciated that, in the alternative to the use of call status signal 42, local node 16 may simply be programmed to communicate the "called party unavailable" message 44 to the calling location 12 if it does not receive an incoming call from telecommunications network 10 within a predetermined period. In this scenario, it is not necessary for signal 42 to be transmitted back from central switching unit 22, through transception channel 22, and to local node 16.

After call termination, node 16 will generate a reverse answer supervision signal 47 to advise unit 22 that calling location 12 has hang-up. This terminates the billing process. Said signal 47 may pass over either network 10 or channel 20.

As indicated by dotted line 46, it is possible to integrate the functions of local node 16 and first data message means 18 such that communications from the calling location to the data signalling channel 20 would occur in a more direct fashion.

Through the above-described method and system, the system time and, thereby, the cost typically incurred by the calling party (or, in the case of a hotel setting, by the hotel itself) in connection with the above-described telecommunication system costs associated with busy and no answer signals is substantially avoided in that use will not be made of the public switched service or other communications network where the first call 37 is not completed. Accordingly, the user will pay only for completed calls and will incur substantially no cost for uncompleted calls. Also the benefits of reverse direction dialing is fully accomplished in the above system in that, where called location 14 is a foreign country or is in an earlier (more westerly) time zone than called location 12, the applicable call rate protocol will generally dictate that savings will be effected if the phonecall is initiated from the United States to the foreign country or, in the case of a domestic call, from the more easterly time zone to the more westerly time zone (except during those situations where the more easterly time zone is within a business day and the business day has not yet begun in the earlier time zone).

In addition to the above set forth advantages of the present method, it may be utilized to effect savings in calling between one foreign country and another foreign country as is discussed in the Background of the Invention above. More particularly, in this scenario, a calling location 48 in a first foreign country wishes to place a call to the called location 14 in a second foreign country. Rather than employ the local foreign phone company (known as the PTT) to call from locations 48 to 14, call 50 is made to local node 16 which call includes caller, destination and security codes. The call is then processed in the same manner as said call 26. If call 50 is completed to location 14, a callback 40/52 occurs from central switching unit 22 to local node 16 to the calling location 48 over network 10, teleconferencing the calling location 48 in a first foreign country with the called location 14 in a second foreign country, all without need to make significant use of the local phone company at location 48. If the central switching unit 22 receives a busy or no answer from location 14, the calling location 48 will receive a "called party not available" message similar to the above-described message 44. Therein, none of the parties, namely, the calling location 48, called party 14, or the operator of local node 16, will have incurred any significant cost by reason of the no answer or busy signal. Thereby the cost of international communication is substantially reduced by both avoiding the unbillable system time, above described in the Background of the Invention, and avoiding the high local foreign country phone company costs which occur in calls directly between countries external to the United States.

Figure 2:
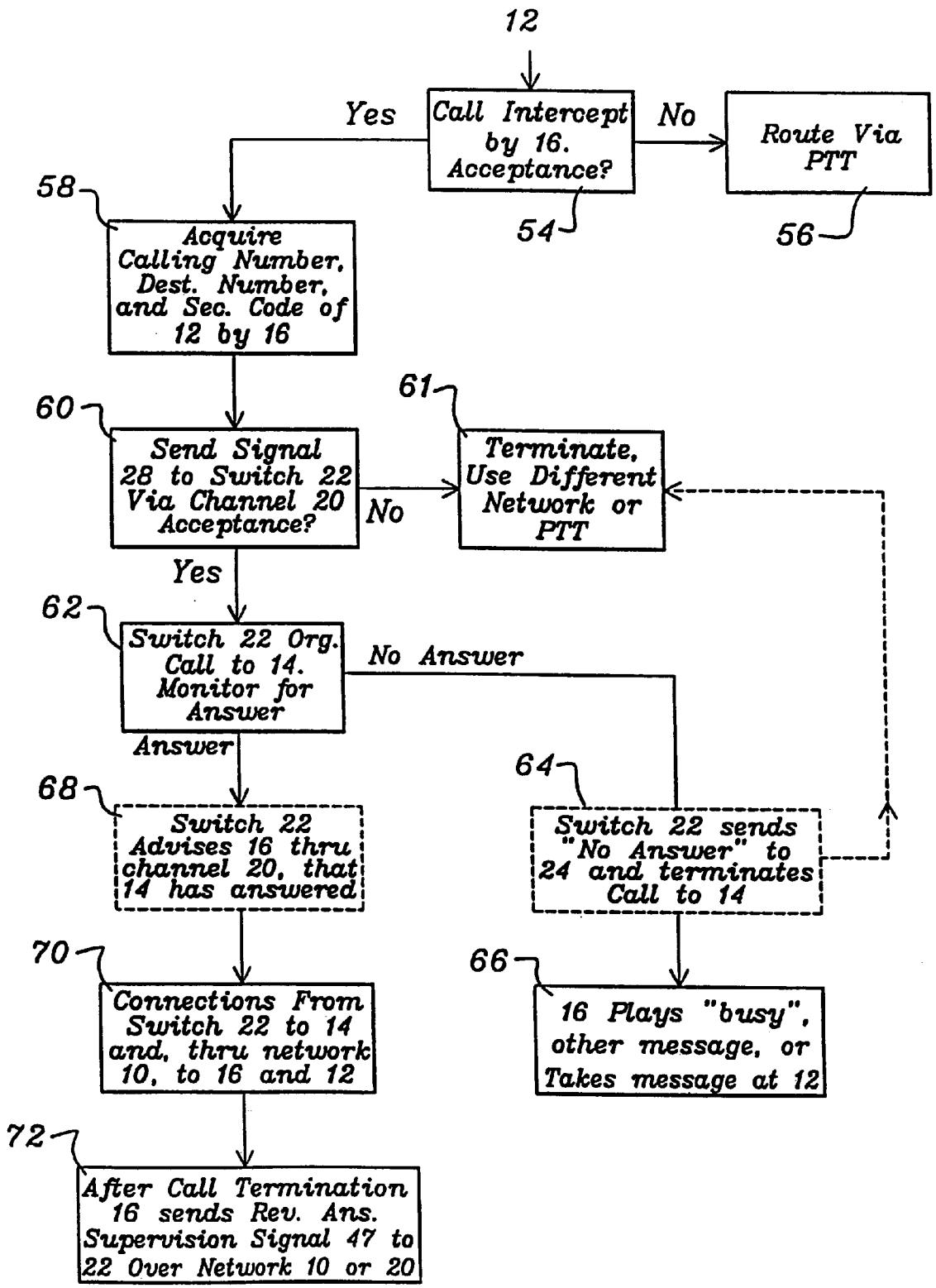
FIG. 2 is a flowchart reflecting the programming of a first embodiment of the inventive system and method.

There is, with reference to FIG. 2, shown a flow diagram of the decision-making process employed in the software associated with local node 16. This software, more particularly, shows, in block 54 thereof, the interception of the call from location call 12 by local node 16. As above noted, node 16 will then use its database to determine whether or not to accept the call for purposes of the present international call back method and system. If node 16 rejects the call, it will be routed to the local PTT as is indicated in block 56. However, if the call is accepted, node 16 will then proceed to acquire the destination number, that is, the called party identification number for the called location 12, as is indicated by block 58.

Therefrom said signal 28 (see FIG. 1), containing the calling and called party identification numbers will be communicated, via data message means 18, external channel 20, and second data message means 24, to said switch 22, as is indicated in block 60. Switch 22 will then make a decision to accept or not to accept the incoming phonecall 34 (see FIG. 1). If the decision is that of non-acceptance, which will manifest itself as an absence in feedback through channel 20 to local node 16, local node 16 will decide whether or not to terminate the call completely, to use a different network, or to use the PTT, as is indicated in block 61.

If the decision of switch 22 is to accept the incoming call, it will originate a call to the called location 14 and will monitor for an answer, as is indicated by block 62. If no answer occurs, switch 22 will terminate call 14 and may either send a "no answer" signal to data message means 24 and therefrom through channel 20 to local node 16 (see block 64) or, alternatively, may send no return message whatsoever. In that embodiment, local node 16 is programmed to construe a no response, after a predetermined interval, e.g., forty-five seconds, from switch 22 as a "no answer." In either event, local node 16 will play a "busy" or "called party unavailable" type message to the calling party 12 as is indicated in block 66.

In the event that called party 14 answers the call originated from switch 22, it may employ channel 20 to advise node 16 that an answer has occurred, as is indicated in block 68 or, alternatively, may go directly to block 70 and, thereby, make a direct connection from switch 22 to local node 16 using the public telecommunications network 10. Therein the call from switch 22 to call location 14 will be teleconferenced with the call from switch 22, through network 10, to the local node 16 and, thereafter, to location 12 or 18. After call termination by calling location 10, the reverse supervision signal 47 is sent to unit 22 over either network 10 or channel 20 (see block 72).

Figure 3:
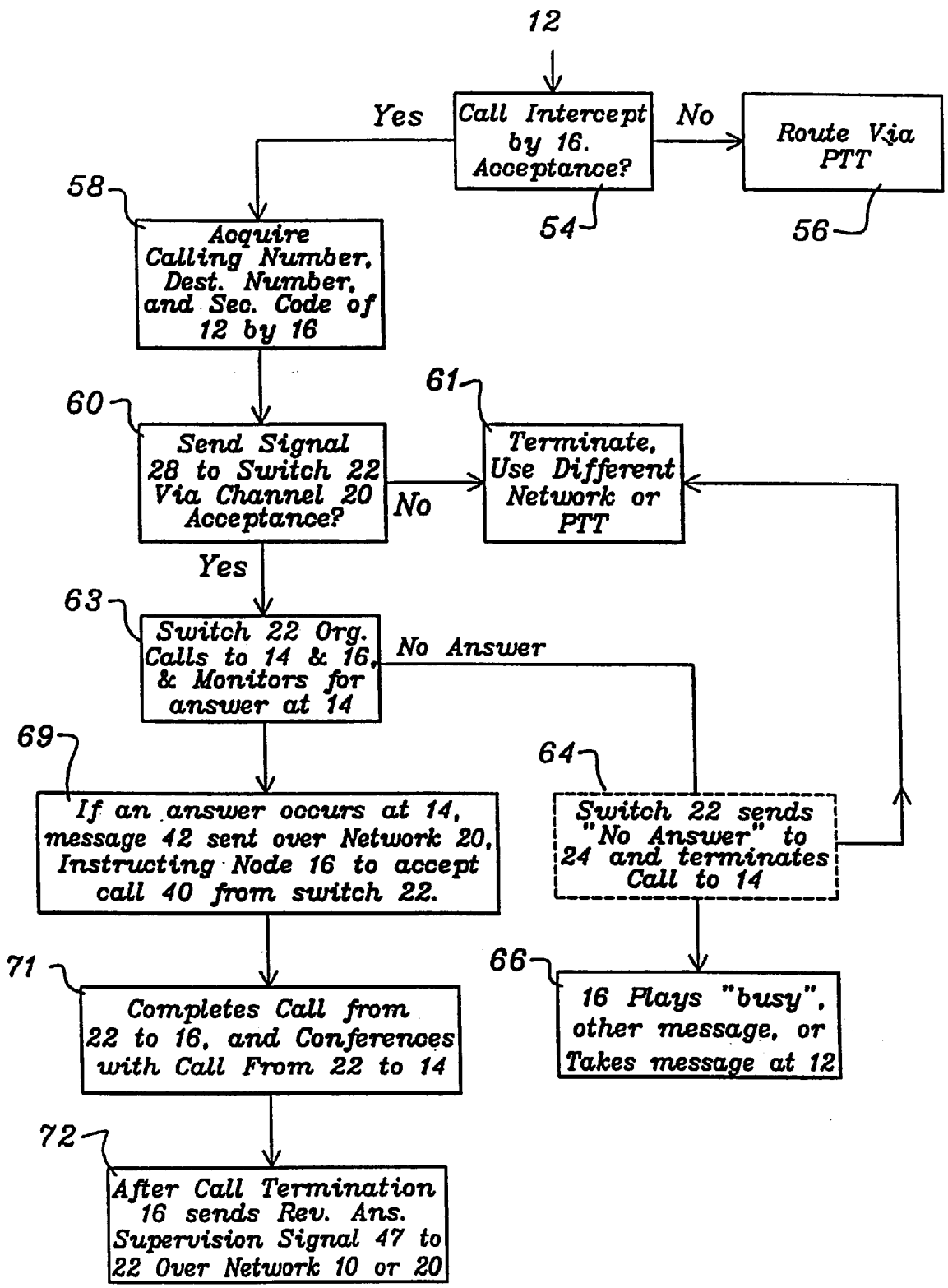
FIG. 3 is a flowchart reflecting the programming of a second embodiment of the invention.

With reference to FIG. 3, there is shown a further embodiment of the invention which differs from that described above only in the use of blocks 63, 69 and 71 in lieu of said blocks 62, 68 and 70.

Therein, in block 63, unit or switch 22 simultaneously originates calls to node 16 and called location 14, while monitoring for an answer at location 14. Called location 12 is kept on hold by node 16 until location 14 answers and instruction 42 is received from unit 22 to node 16 instructing it to complete call 40 to location 12 (see block 69). If an answer occurs, unit 22 completes the call 40 to calling location 12 and conferences that call to the completed call at location 14, thereby connecting the parties (see block 71).

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described my invention what I claim as new, useful and non-obvious and, accordingly, secure by Letters Patent of the United States is:

1. A method of use of a telecommunication system including a calling telephone equipment, a telecommunication network and a called telephone equipment, comprising the steps of:
   (a) transmitting to a control location identification for the calling telephone equipment and the called telephone equipment;
   (b) receiving at the control location identification for the calling telephone equipment and the called telephone equipment;
   (c) determining whether a call from the calling location to the called party access number should be connected via the telecommunication network, the step of determining being carried out in a manner transparent to the calling party and the called party; and
   (d) connecting the call from the calling party access number to the called party access number via the telecommunication network, when the step of determining results in a determination that the call should be connected via the telecommunication network.

2. A method according to claim 1 wherein the step of determining results in a determination that the call should be connected via the telecommunications network when the called location is available for taking an incoming call.

3. A method according to claim 1 wherein the step of determining includes:
   (e) receiving a status signal at said control location indicating if said called party is available for taking an incoming phone call.

4. A method according to claim 1 wherein the step of connecting the call comprises the steps of:
   (f) in response to said status signal, initiating a first phone call from said control location to said called party identification number and a second phone call from said control location to said calling party identification number; and
   (g) bridging said first and second phone calls.

5. A telecommunication system including a calling telephone equipment, a telecommunication network and a called telephone equipment, including:
   (a) means for transmitting to a control location identification for the calling telephone equipment and the called telephone equipment;
   (b) means for receiving at the control location identification for the calling telephone equipment and the called telephone equipment;
   (c) means for determining whether a call from the calling location to the called party access number should be connected via the telecommunication network in a manner transparent to the calling party and the called party; and
   (d) means for connecting the call from the calling party access number to the called party access number via the telecommunication network, when the step of determining results in a determination that the call should be connected via the telecommunication network.

6. A method of use of a telecommunication network including a calling telephone equipment and a called telephone equipment, comprising the steps of:
   (a) selecting a transmission path connecting a calling telephone equipment and a called telephone equipment, the step of selecting being carried out in a manner transparent to the calling party and the called party;
   (b) receiving at a control location identification for the calling telephone equipment and the called telephone equipment;
   (c) determining whether a call from the calling location to the called party access number should be connected via the selected transmission path, the step of determining being carried out in a manner transparent to the calling party and the called party; and
   (d) connecting the call from the calling party access number to the called party access number via the selected transmission path in a manner transparent to the calling party and the called party, when the step of determining results in a determination that the call should be connected via the selected transmission path.

7. A method according to claim 6 including the further steps of:
   (e) receiving a status signal at said control location indicating if said called party is available for taking an incoming phone call;
   (f) in response to said status signal, initiating a first phone call from said control location to said called party identification number and a second phone call from said control location to said calling party identification number; and
   (g) bridging said first and second phone calls.

8. A method according to claim 7 further comprising the step of completing the second phone call in response to receiving a further status signal indicating that the first phone call has been completed.

9. A method according to claim 6 wherein step (c) includes the step of evaluating whether said called party access number is available for taking an incoming phone call.

10. A telecommunication network including a calling telephone equipment and a called telephone equipment, including:
   (a) means for selecting a transmission path connecting a calling telephone equipment and a called telephone equipment in a manner transparent to the calling party and the called party;
   (b) a control location arranged to receive identification for the calling telephone equipment and the called telephone equipment;
   (c) means for determining whether a call from the calling location to the called party access number should be connected via the selected transmission path in a manner transparent to the calling party and the called party; and
   (d) means for connecting the call from the calling party access number to the called party access number via the selected transmission path in a manner transparent to the calling party and the called party, when the step of determining results in a determination that the call should be connected via the selected transmission path.

* * * * *